United States Patent
Wang et al.

(10) Patent No.: US 9,134,718 B2
(45) Date of Patent: Sep. 15, 2015

(54) LOW POWER CONSUMPTION CONTROL CIRCUIT AND OPERATION METHOD THEREOF

(75) Inventors: Jinyou Wang, Shenzhen (CN); Xuexing Wang, Ghenzhen (CN)

(73) Assignee: Shenzhen BOFU Mechanic & Electronic Co., Ltd., Shenzhen (CN)

( * ) Notice: Subject to any disclaimer, the term of this patent is extended or adjusted under 35 U.S.C. 154(b) by 1091 days.

(21) Appl. No.: 13/142,401

(22) PCT Filed: Jan. 15, 2010

(86) PCT No.: PCT/CN2010/070231
§ 371 (c)(1),
(2), (4) Date: Jun. 27, 2011

(87) PCT Pub. No.: WO2010/083744
PCT Pub. Date: Jul. 29, 2010

(65) Prior Publication Data
US 2011/0267025 A1   Nov. 3, 2011

(30) Foreign Application Priority Data
Jan. 22, 2009  (CN) .......................... 2009 1 0105243

(51) Int. Cl.
| G06F 1/00 | (2006.01) |
| G05F 1/46 | (2006.01) |
| G05B 19/042 | (2006.01) |
| H04B 1/16 | (2006.01) |
| H04L 12/12 | (2006.01) |
| H04B 1/28 | (2006.01) |
| H04W 52/02 | (2009.01) |
| H04L 12/28 | (2006.01) |

(52) U.S. Cl.
CPC ............ G05B 19/042 (2013.01); H04B 1/1615 (2013.01); H04L 12/12 (2013.01); H04W 52/0225 (2013.01); G05B 2219/25289 (2013.01); H04B 1/28 (2013.01); H04L 2012/285 (2013.01); H04W 52/0216 (2013.01); H04W 52/0293 (2013.01); Y02B 60/50 (2013.01)

(58) Field of Classification Search
CPC .... G06F 1/3287; G06F 1/3234; G05B 19/042
USPC ........................... 713/320–324; 323/349, 350
See application file for complete search history.

(56) References Cited

U.S. PATENT DOCUMENTS

2005/0215210 A1* 9/2005 Walker et al. .................. 455/130
2006/0043208 A1* 3/2006 Graham ........................... 239/71

FOREIGN PATENT DOCUMENTS

WO        WO01/20790 A1    3/2001

*Primary Examiner* — Jue Zhang
(74) *Attorney, Agent, or Firm* — IPro, Inc.; Na Xu

(57) ABSTRACT

The present invention discloses a low-power control circuit that comprises a receiver circuit and a control chip, wherein the receiver circuit is signally connected with the control chip, and the control chip is connected with an actuating mechanism. The present invention is characterized in that the low-power control circuit also comprises a clock generator control circuit which is respectively and signally connected with the receiver circuit and the control chip. Because the clock generator control circuit is adopted in the present invention to close the receiver circuit at regular time, the control chip is awakened only when output signal exists in the receiver circuit. Therefore, the control chip is in sleep state (also called standby state) in general. The power consumption of the control chip in standby state is about a few tenths of microampere in general, which is much less than the power consumption (about several milliamperes) of control chip in operation and is much less than the power consumption (about dozens of microamperes) of the dual-frequency control chip in low frequency state. Thus, the present invention can greatly reduce the electric energy consumption of the control chip, so that the control circuit can save electric energy.

14 Claims, 8 Drawing Sheets

LOW POWER CONSUMPTION CONTROL CIRCUIT AND OPERATION METHOD THEREOF

TECHNICAL FIELD

The present invention relates to a control circuit, particularly to a low-power control circuit and an operating method thereof.

BACKGROUND

With the development of science and technology, more and more facilities are operated by circuits, such as electric curtains, electric doors and windows, electric lamps, etc. Each control circuit comprises a receiver circuit and a control chip, wherein: the receiver circuit is signally connected with the control chip; the control chip is connected with an actuating mechanism (the actuating mechanisms can be electric curtains, electric doors and windows, electric lamps, etc.); the receiver circuit is used for receiving command information; and the control chip is used for issuing different execution commands to the actuating mechanism. In addition, the control circuit also has a power circuit to supply power source to the receiver circuit and the control chip. Because the receiver circuit and the control chip are in operation all the time, and the receiver circuit and the control chip need to consume electric energy during operation. But in fact no command information is input in most of the time, the electric energy consumed by the receiver circuit and the control chip is used in vain without the input of a command, which causes a waste of electric energy. Particularly under the condition that the receiver circuit, the control chip and the actuating mechanism are supplied by battery, most electric energy of the battery is consumed by the receiver circuit and the control chip and not by the actuating mechanism. It turns out that the electric energy of the battery is consumed rapidly. Thus, the battery needs to be continuously replaced. For the control circuit for a DC tubular motor, the operating current of the receiver circuit is about 7 milliamperes in general, and the operating current of the control chip is also about 7 milliamperes in general. If the battery is a battery block of 1800 milliamperes, the battery can supply the receiver circuit and the control chip for operation for more than 100 hours, namely the electric energy can be completely consumed within 5 days. However, the battery block of 1800 milliamperes can enable a motor of 380 milliamperes (in general the operating time of the motor is 30 seconds each time) to operate 570 times. If such a motor is operated twice in one day, the battery block can last for one year. Thus, we can see that the consumed energy is mainly used by the receiver circuit and the control chip in general.

The Chinese patent 200580009297.7 discloses a low-power Rf control system, which is a low-power control circuit in fact. A dual-frequency control chip is used in the patent. The control chip is in low-frequency control state generally, and consumes about 20 to 30 microamperes in low-frequency state in general and about 7 milliamperes in high-frequency state. Meanwhile, the receiver module has two states including a sleep state and an operating state, and consumes about 2 microamperes in the sleep state and about 7 milliamperes in the operating state. The receiver module is turned on by the control chip at regular intervals to enable the receiver module to be in the operating state for about 1 millisecond. The receiver circuit is turned on once in about several dozens of milliseconds in general. As such, the power consumption rate of the receiver circuit can be lowered by several dozens of folds. Said control chip is often in low-frequency state, and saves electric energy in comparison to the original control chip which is in high-frequency state all the time. But because said control chip still consumes about 20 to 30 microamperes in low-frequency state, the control chip still consumes a lot of energy.

SUMMARY

One of the technical problems to be solved by the present invention is to provide a low-power control circuit. The electric energy consumption of the control chip can be reduced by using said control circuit, so that the control circuit can save electric energy.

The low-power control circuit of the present invention comprises a receiver circuit and a control chip, wherein the receiver circuit is signally connected with the control chip, and the control chip is connected with an actuating mechanism. The present invention is characterized in that the low-power control circuit also comprises a clock generator control circuit which is respectively and signally connected with the receiver circuit and the control chip.

The clock generator control circuit comprises a switch circuit, a RC bridge circuit, a clock generator control power circuit and an oscillator enable control circuit, wherein: the switch circuit is electrically connected with the RC bridge circuit; the clock generator control power circuit supplies power source to the switch circuit and the RC bridge circuit; the control chip is signally connected with the oscillator enable control circuit; and the oscillator enable control circuit is signally connected with the switch circuit. This is an embodiment of the clock generator control circuit.

The switch circuit is a threshold oscillator analog switch circuit, and the circuit can reduce power consumption.

The power circuit is a buck circuit. Thus, the power consumption of the switch circuit can be reduced, and then the power consumption of the clock generator control circuit can be reduced.

The buck circuit is a diode series buck circuit, and the buck circuit can accurately reduce voltage.

The receiver circuit is a wireless receiver circuit, and the circuit comprises a high-frequency receiver frequency selecting circuit, a superheterodyne receiver circuit, an intermediate-frequency filter, a crystal local oscillator circuit, a RXD (received data) squelch circuit, and the above circuits are electrically connected. Thus, the noise in the signal output by the superheterodyne receiver circuit can be reduced.

The RXD squelch circuit comprises two parts: an analog integration ratio circuit and a logic processing circuit, wherein the received signal strength indication of the superheterodyne receiver circuit is output to the analog integration ratio circuit; the data of the data processing loop of the superheterodyne receiver circuit and the local output data are output to the logic processing circuit; the analog signal of the analog integration ratio circuit is output to the logic processing circuit; and the low noise signal is output by the logic processing circuit. In the design, the analog integration ratio circuit can judge whether the received analog signal is at the accepted carrier frequency; if yes, the logic processing circuit is allowed to process the signal; if not, the logic processing circuit is not allowed to process the signal. Thus, the output signal in non-operating state can be shielded, and then the zero noise output of the wireless receiver circuit can be realized.

The second technical problem to be solved by the present invention is to provide a method for the control circuit to realize low power.

The method of the present invention comprises the following procedures.

A. When the control chip is in the sleep state, the timing circuit operates.

B. The clock generator control circuit generates timing sequence signal to close or open receiver circuit at regular time.

C. When the receiver circuit is in the open state, if there are co-frequency signals, the output port produces variation of data, and go to procedure E; if there are no co-frequency signals, the output port keeps high level all the time.

D. When the receiver circuit is in the close state, the receiver circuit does not operate.

E. Awaken the control chip. The control chip outputs control command to enable the receiver circuit to be in the operating state within the time (such as 200 milliseconds) set by the control chip. In the operating time, the received signal is decoded and judged. If the signal is an invalid signal (different from the ID number stored in the control chip), close the receiver circuit and open the timing circuit, and the control chip goes to the sleep state, and go to procedure B; if the signal is a valid signal, execute the corresponding command. After the command is executed, close the receiver circuit and open the timing circuit, and the control chip goes to sleep state, and go to procedure B.

In the procedure E, after the control chip is awakened, the control chip directly outputs control command to enable the receiver circuit to be in the operating state within the time set by the control chip. In the operating time, if the signal is an invalid signal (different from the ID number stored in the control chip), close the receiver circuit and open the timing circuit, the control chip goes to sleep state, and go to procedure B; if the signal is a valid signal, execute the corresponding command, and directly control the receiver circuit to be in open state all the time. After the command is executed, close the receiver circuit and open the timing circuit, the control chip goes to sleep state, and go to procedure B. Said method is that the control chip is connected with the receiver circuit, and the receiver circuit is directly controlled to be in open state under certain conditions.

In the procedure E, after the control chip is awakened, the control chip directly outputs control command to clock generator control circuit, and the clock generator control circuit controls the receiver circuit to be in the operating state within the time set by the control chip. In the operating time, if the signal is an invalid signal (different from the ID number stored in the control chip), close the receiver circuit and open the timing circuit, and the control chip goes to the sleep state, and go to procedure B; if the signal is a valid signal, execute the corresponding command, output command to the clock generator control circuit, and the clock generator control circuit controls the receiver circuit to be in the open state all the time. After the command is executed, close the receiver circuit and open the timing circuit, and the control chip goes to sleep state, and go to procedure B. Said method is that the control chip is not directly connected with the receiver circuit, and the receiver circuit is controlled to be in open state by the clock generator control circuit under certain conditions.

Because the clock generator control circuit is adopted in the present invention to open the receiver circuit at regular time, the control chip is awakened only when output signal exists in the receiver circuit. Therefore, the control chip is in the sleep state (also called standby state) in general. The power consumption of the control chip in standby state is about a few tenths of microampere in general, which is much less than the power consumption (about several milliamperes) of control chip in operation and is much less than the power consumption (about several dozens of microamperes) of the dual-frequency control chip in low-frequency state. Thus, the present invention can greatly reduce the electric energy consumption of the control chip, so that the control circuit can save electric energy.

DETAILED DESCRIPTION

Figure 1:
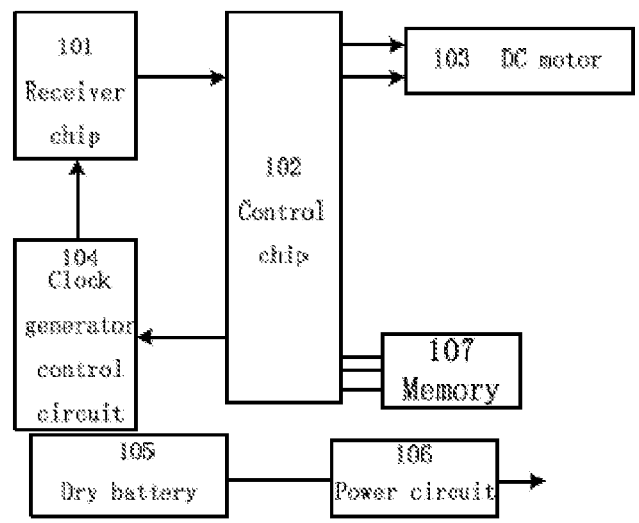
FIG. 1 is the structure block diagram of the control circuit of the Embodiment.

Refer to FIG. 1.

The low-power control circuit of the Embodiment is used for controlling the DC motor of an automatic curtain, and the low-power control circuit comprises a receiver circuit 101, a control chip 102 (which mostly adopts a chip microprocessor), a clock generator control circuit 104 and a memory 107, wherein the receiver circuit 101 is signally connected with the control chip 102; the control chip 102 is connected with the memory 107 and the DC motor 103 (namely a kind of actuating mechanism); and the clock generator control circuit 104 is respectively and signally connected with the receiver circuit 101 and the control chip 102. In addition, the low-power control circuit also has a dry battery 105 of 15V, and the power circuit 106 changes the 15V voltage output by the dry battery 105 into 5V voltage and then supplies to all the circuits.

Figure 2:
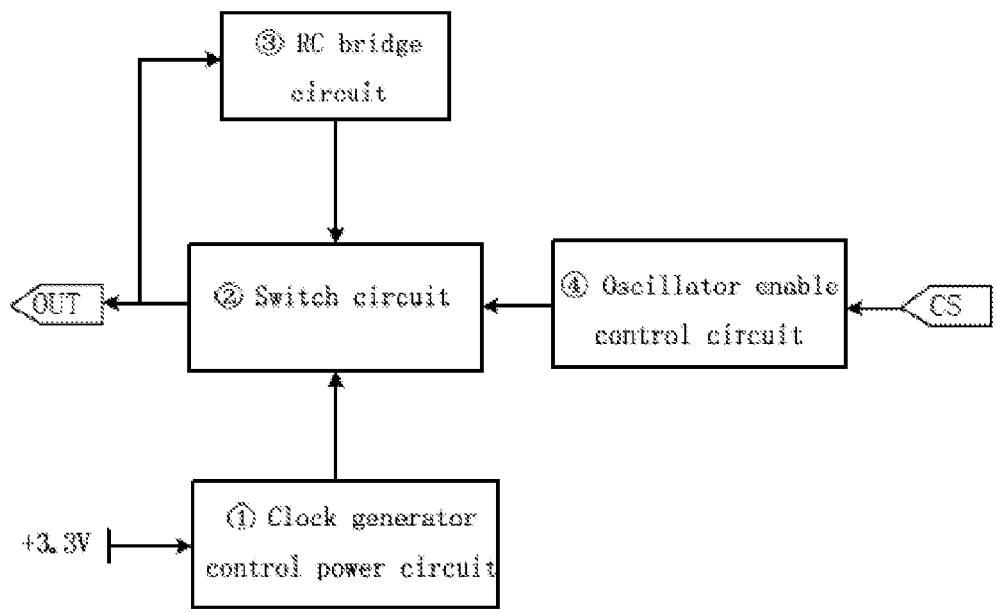
FIG. 2 is the structure block diagram of the clock generator control circuit of the Embodiment.
Figure 3:
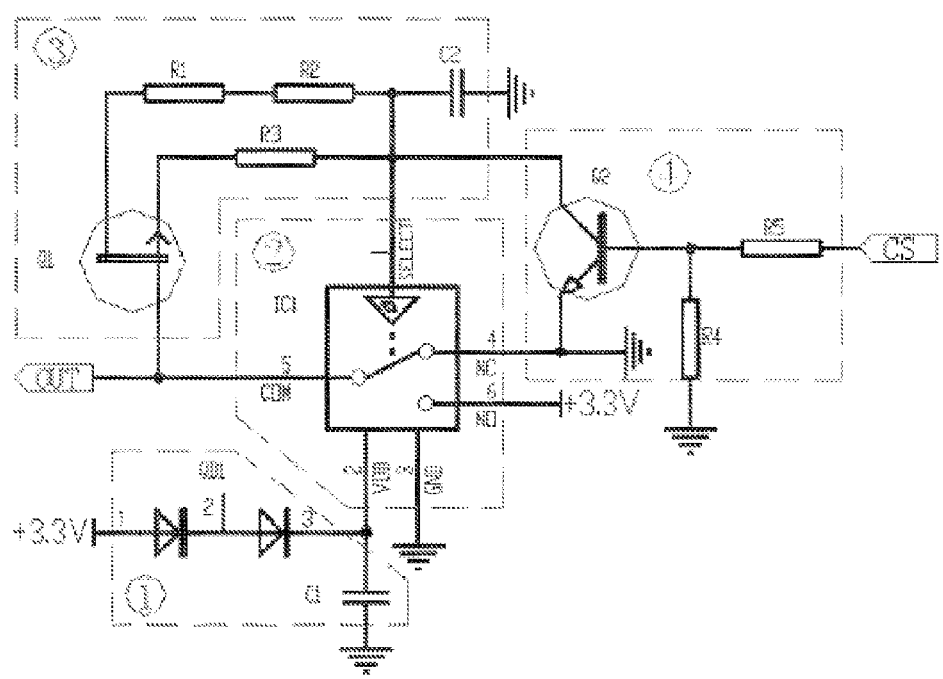
FIG. 3 is the circuit diagram of the clock generator control circuit of the Embodiment.

Refer to FIG. 2 and FIG. 3.

The clock generator control circuit 104 comprises a switch circuit 2, a RC bridge circuit 3, a clock generator control power circuit 1 and an oscillator enable control circuit 4, wherein the switch circuit 2 is electrically connected with the RC bridge circuit 3; the clock generator control power circuit 1 supplies power source to the switch circuit and the RC bridge circuit; the control chip 102 is signally connected with the oscillator enable control circuit 4; and the oscillator enable control circuit 4 is signally connected with the switch circuit 2; the clock generator control circuit provides the timing delay and duty cycle proportion coefficient of the oscillator circuit; the oscillator enable control circuit is used for controlling the opening/closing of the low-power timing generator circuit to cooperate with the operation of the whole circuit, and the switch circuit is a threshold oscillator analog switch circuit and provides the threshold comparison and logic state transition necessary for the whole circuit; the power circuit is a buck circuit with two diodes in series connection. The input voltage of the power circuit is 3V. After the voltage is reduced by the two diodes in series connection, the operating voltage supplied to the threshold oscillator analog switch circuit is 1.6V, and the output voltage of the threshold oscillator analog switch circuit is still 3V. Thus, the power consumption of the switch circuit can be reduced. The power consumption of the clock generator control circuit is very low and is 0.1 microampere in general. Because the oscillator enable control circuit 4 and the RC bridge circuit 3 are known circuits, the two circuits are not further descried in detail.

Figure 4:
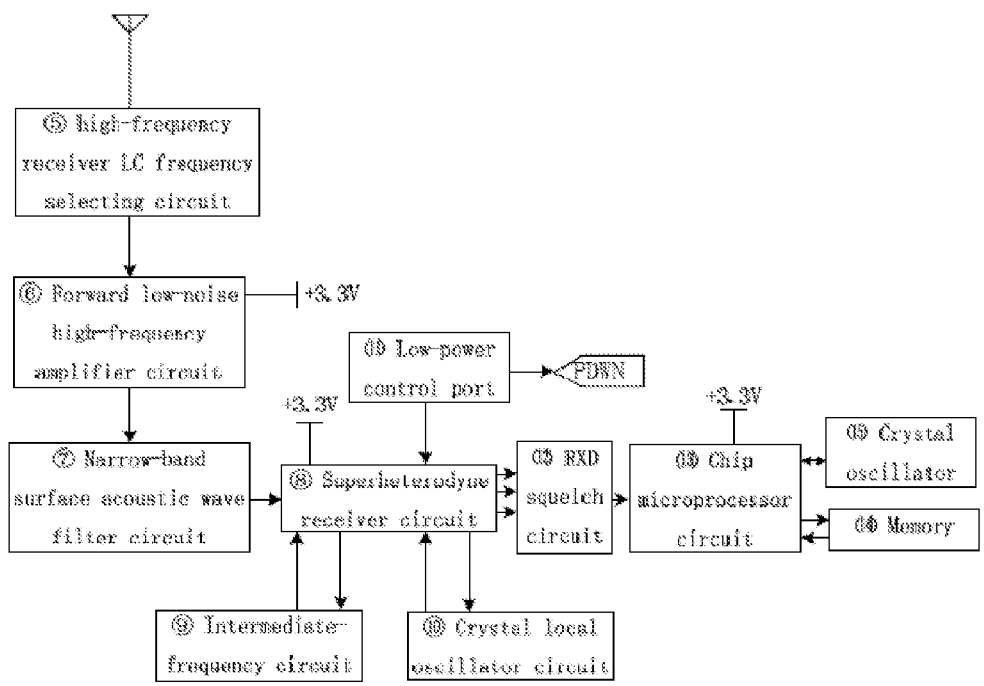
FIG. 4 is the structure block diagram of the receiver circuit of the Embodiment.
Figure 5:
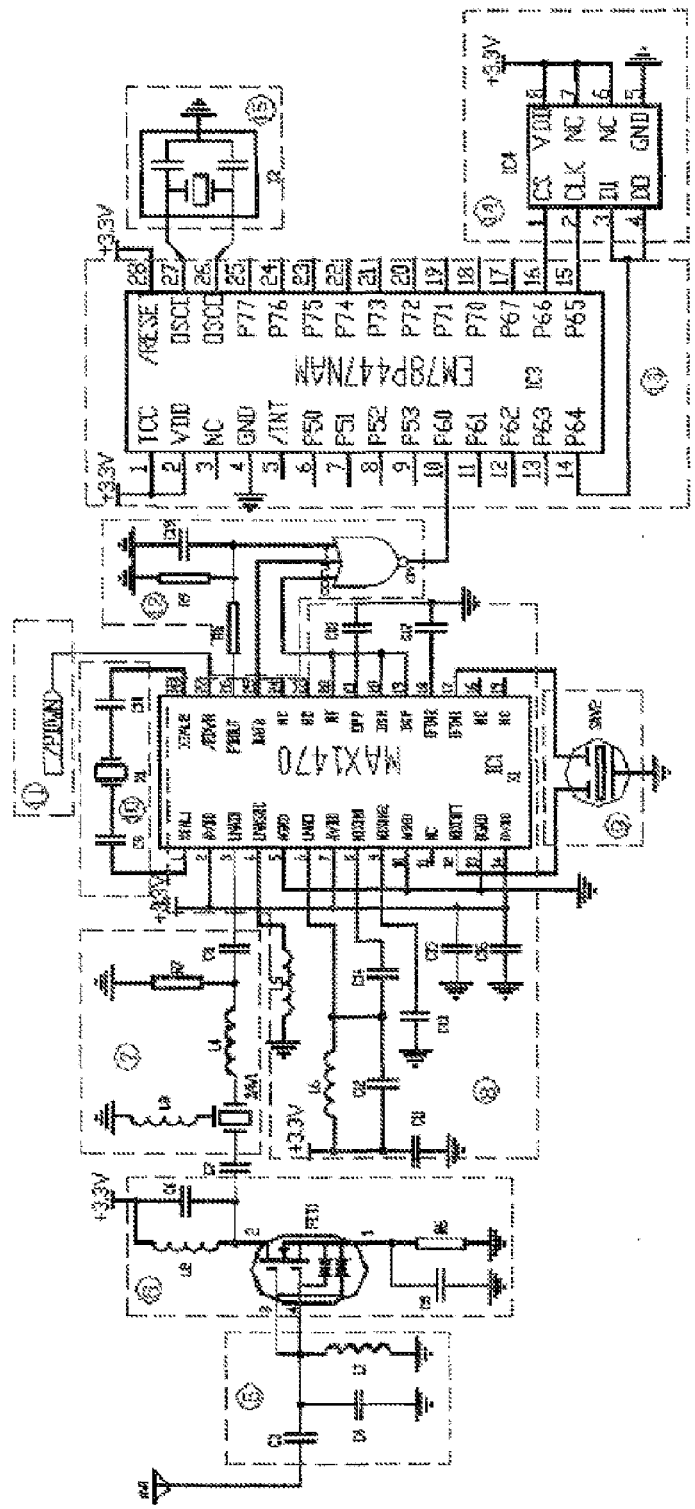
FIG. 5 is the structure schematic diagram of the receiver circuit of the Embodiment.

Refer to FIG. 4 and FIG. 5.

The receiver circuit is a wireless receiver circuit and adopts the carrier frequency adjacent to 433.42 MHz. The receiver circuit comprises a high-frequency receiver LC frequency selecting circuit (also called high-frequency receiver frequency selecting circuit) 5, and the receiver circuit is used for matching the quarter wavelength receiving antenna, and locating the high Q resonator adjacent to the 433.42 MHz carrier frequency through the LC loop parameter, to provide high receiver sensitivity; the forward low-noise high-frequency amplifier circuit 6 is used for amplifying the high-frequency signal which is received by the circuit 5 and is adjacent to the 433.42 MHz carrier frequency of nanovolt, to enhance the receiver sensitivity and compensate the insertion attenuation of the circuit 7; the narrow-band surface acoustic wave filter circuit 7 is used for precisely filtrating the high-frequency carrier signal received and amplified by the circuit 6, to intercept the carrier data modulating signal of basic frequency (433.42 MHz)±1 KHz and input the signal into the circuit 8; the superheterodyne receiver circuit 8 is a primary function chip of the receiver circuit and is used for frequently selecting and amplifying the high-frequency carrier signal received by the circuit 7, demodulating the heterodyne carrier data, recovering the baseband data, performing data filtering, amplifying and shaping functions, and inputting the processed RXD into the circuit 12; the intermediate-frequency filter 9 is a 10.7 MHz SAW intermediate-frequency filter and is used for providing low-noise input circuit for the IF limiting amplifier of the circuit 8; the crystal local oscillator circuit 10 is a crystal oscillator series resonance circuit and is used for providing resonance reference for the PLL local resonance circuit of the circuit 8 to enable the PLL local resonance circuit to accurately receive the 433.42 MHz carrier frequency; the low-power control port 11 of the receiver is used for shifting the receiving state/standby state of the circuit 8 so that the power consumption of the circuit 8 is controlled; the RXD squelch circuit 12 is used for processing the received signal strength indication (RSSI) of the superheterodyne receiver circuit 8, the data of the data processing loop (IF/DATA), the local output data (DATA), and simulation proportion and logic squelch of the three signals, so that the zero noise output of the receiver is realized and the processed data is input into the circuit 13; the chip microprocessor circuit 13 is used for digitally decoding the data input by the circuit 12; the memory 14 is a peripheral accessory of the circuit 13 and is used for the constant configuration data of the memory circuit 13 during program run; the crystal oscillator 15 is a peripheral accessory of the circuit and is used for producing the clock pulse necessary for the operation of the circuit 13.

The signal of the high-frequency receiver LC frequency selecting circuit is output to the low-noise high-frequency amplifier circuit 6; the signal of the low-noise high-frequency amplifier circuit 6 is output to the narrow-band surface acoustic wave filter circuit 7; the signal of the narrow-band surface acoustic wave filter circuit is output to the superheterodyne receiver circuit 8; the signal of the superheterodyne receiver circuit 8 is output to the RXD squelch circuit 12; the signal of the RXD squelch circuit 12 is output to the chip microprocessor circuit 13; and the signal of the chip microprocessor circuit 13 is output to the motor; the intermediate-frequency filter 9, the crystal local oscillator circuit 10 and the low-power control port 11 of the receiver are respectively and electrically connected with the superheterodyne receiver circuit 8; the memory 14 and the crystal oscillator 15 are respectively and electrically connected with the chip microprocessor circuit 13.

Figure 6:
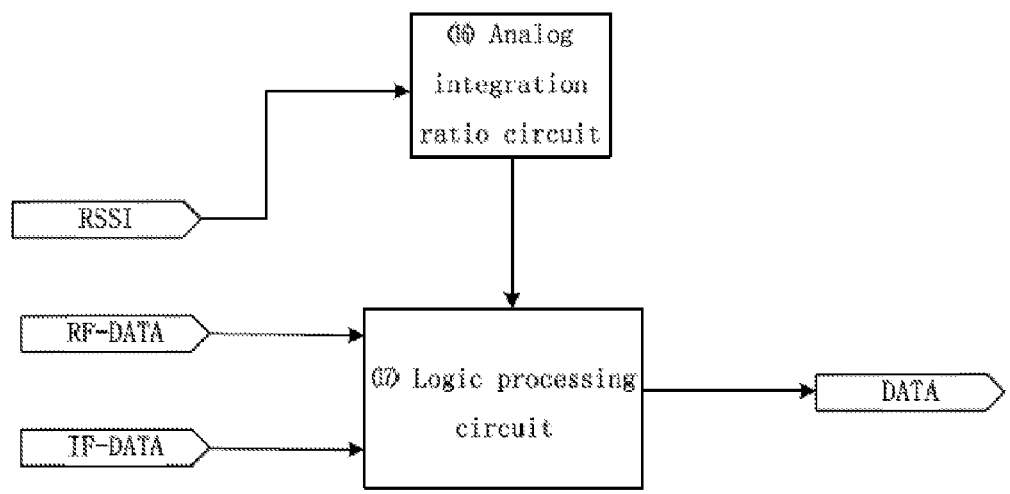
FIG. 6 is the structure block diagram of the RXD squelch circuit of the Embodiment.
Figure 7:
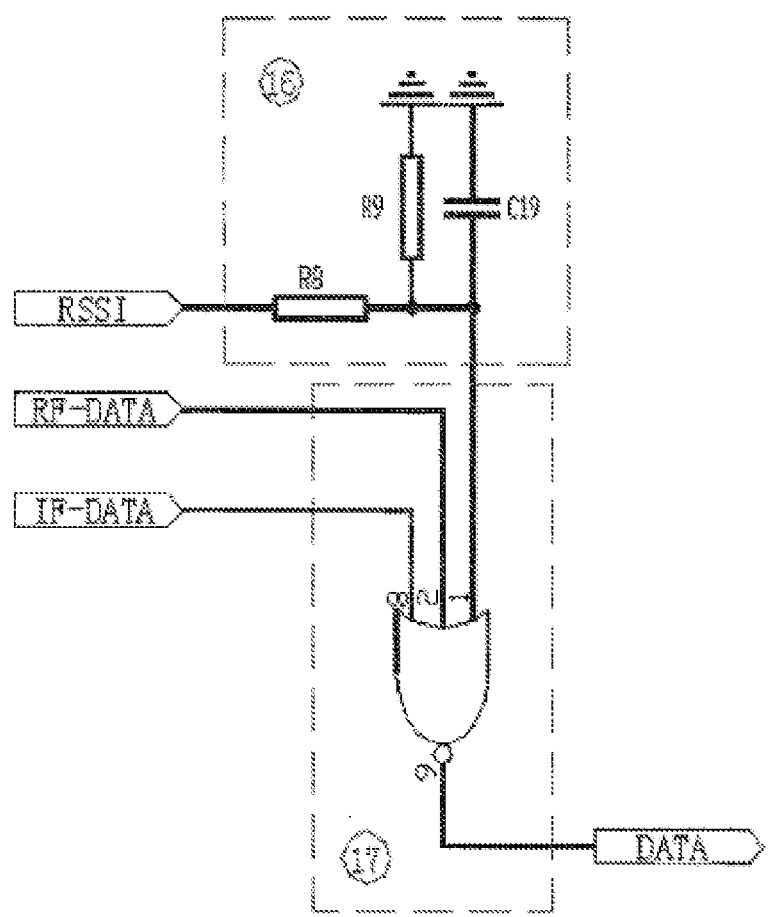
FIG. 7 is the structure schematic diagram of the RXD squelch circuit of the Embodiment.

Refer to FIG. 6 and FIG. 7.

The RXD squelch circuit comprises two parts: an analog integration ratio circuit 16 and a logic processing circuit 17, wherein the received signal strength indication (RSSI) of the superheterodyne receiver circuit 8 is output to the analog integration ratio circuit 16; the data of the data processing loop (IF/DATA) and the local output data (DATA) of the superheterodyne receiver circuit 8 are output to the logic processing circuit 17; the analog signal of the analog integration ratio circuit is output to the logic processing circuit 17; and the low-noise signal is output by the logic processing circuit 17. The analog integration ratio circuit 16 comprises an integrator resistor R8, a discharge resistor R9 and an integrator capacitor C19, wherein the discharge resistor R9 is connected with the integrator capacitor C19; the ends of the discharge resistor R9 and the integrator capacitor C19 connected in parallel are connected with the ground; and the other ends are respectively connected to the input end of the logic processing circuit 17 and the output end of the integrator resistor R8, and the output end of the received signal strength indication of the superheterodyne receiver circuit 8 is connected with the input end of the integrator resistor R8. The logic processing circuit 17 is a logic processing chip.

By adopting the circuit design of the embodiment, the noise in the signal output by the superheterodyne receiver circuit 8 can be completely shielded, and thus the zero noise output of the wireless receiver circuit can be realized.

The operating process of the low-power control circuit of the embodiment will further be described in accordance with the figures.

Refer to FIG. 8 to FIG. 12.

1. Start.

2. When the control chip is in sleep state, the timing circuit operates.

Figure 8:
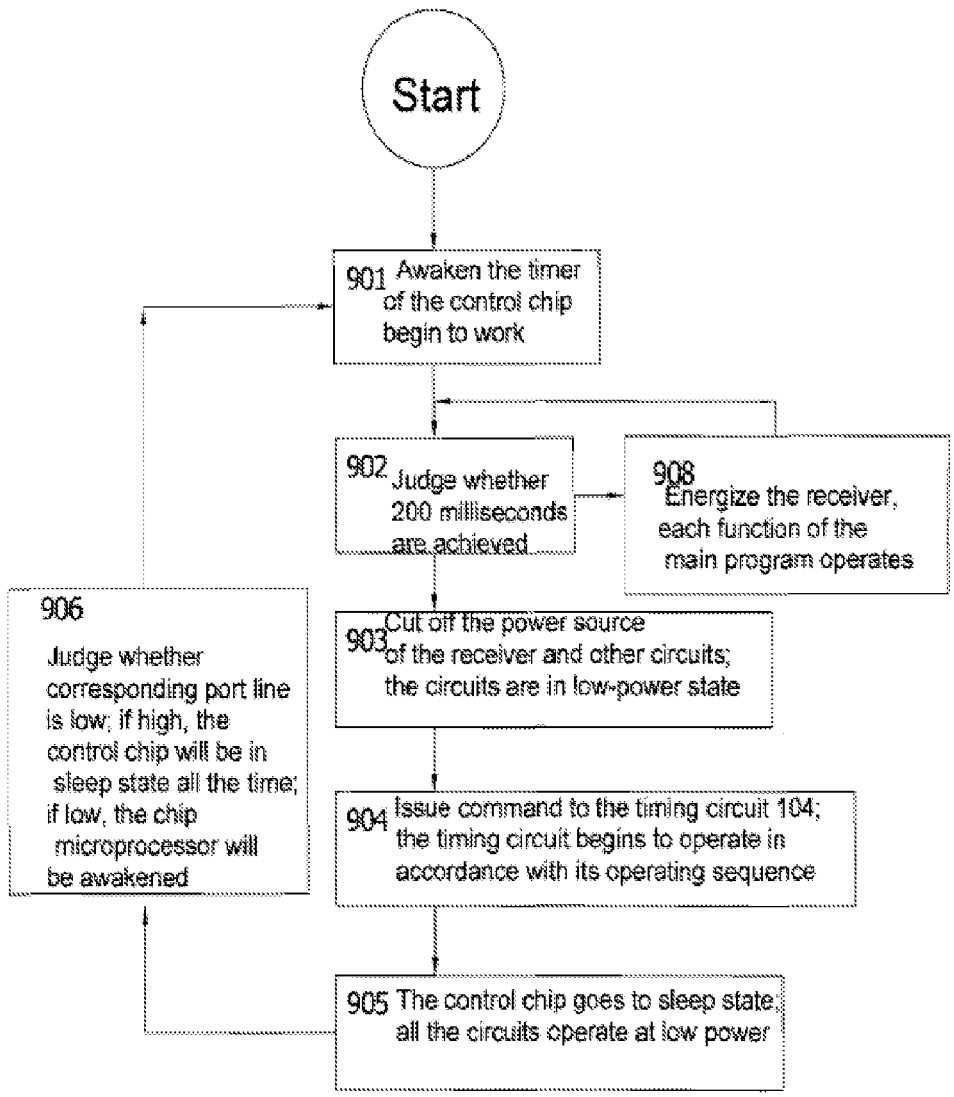
FIG. 8 is the work flow diagram of the control chip of the Embodiment.
Figure 9:
FIG. 9 is the work timing diagram of the clock generator control circuit of the Embodiment.
Figure 10:
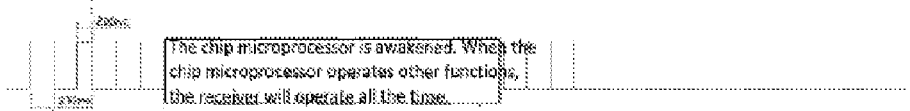
FIG. 10 is the work timing diagram of the receiver circuit of the Embodiment.
Figure 11:
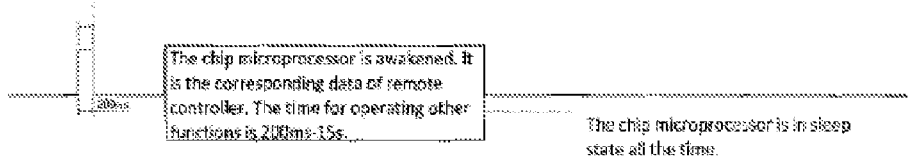
FIG. 11 is the work timing diagram of the control chip of the Embodiment.
Figure 12:
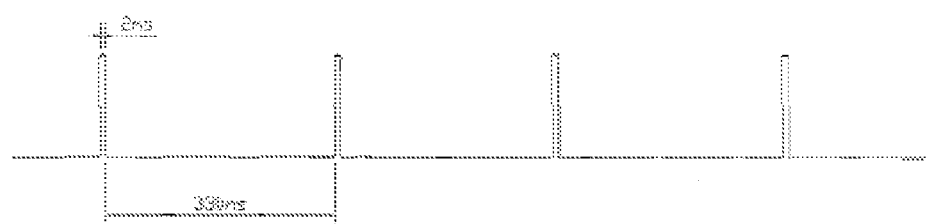
FIG. 12 is the work timing diagram of the receiver circuit of the Embodiment.

3. Refer to FIG. 9 and FIG. 12, the clock generator control circuit 104 (namely the timing circuit described in FIG. 8) generates timing sequence signal, issues command to the receiver circuit (namely the receiver described in FIG. 8) every 330 seconds (namely ms) to open the receiver circuit for 2 seconds, and the receiver circuit is in close state after 2 seconds.

4. When the receiver circuit is in open state, if there are co-frequency signals, the output port produces variation of data, and go to procedure 6; if there are no co-frequency signals, the output port keeps high level all the time.

5. When the receiver circuit is in close state, the receiver circuit does not operate.

6. Refer to FIG. 8, awaken the control chip, and perform the following procedures:

901. Awaken the control chip, then the timer of the control chip begins the work of 200 millisecond countdown;

902. Judge whether 200 milliseconds are achieved; if yes, go to 903; if not, go to 908;

903. Cut off the power source of the receiver and other circuits; the circuits are in low-power state; go to 904;

904. Issue command to the timing circuit 104; the timing circuit begins to operate in accordance with its operating sequence; go to 905;

905. The control chip goes to sleep state; all the circuits operate at low power; go to 906.

906. Judge whether corresponding port line is low; if high, the control chip will be in sleep state all the time; if low, the chip microprocessor will be awakened; go to 901;

908. Energize the receiver; each function of the main program operates; in the operating time of 200 milliseconds, the received signal is decoded and judged; if the signal is an invalid signal (different from the ID number stored in the control chip), go to 902; if the signal is a valid signal, execute the corresponding command; after the command is executed, close the receiver circuit; go to 902.

The power consumption of the control circuit of such design when the clock generator control circuit 104 normally operates is about 0.1 microampere, and the power consumption of the control chip is about 0.8 microampere, which is much less than the power consumption (about dozens of milliamperes) of the dual-frequency control chip in low-frequency state. Thus, the present invention can greatly reduce the electric energy consumption of the control chip, so that the control circuit can save electric energy.

The present invention is described in detail in accordance with the above contents combining with the preferred Embodiment, and the specific Embodiments of the present invention are only limited to these descriptions. For the ordinary technical personnel of the technical field of the present invention, the technical personnel can also make several simple deductions or replacements; for example, the power circuit of the clock generator control circuit 104 can adopt buck circuits with more than diodes in series connection or other buck circuits; the actuating mechanisms can be other components, such as electric lamps, etc., and such deductions or replacements should be considered to belong to the protection range of the present invention.

We claim:

1. A low-power control circuit comprises a receiver circuit and a control chip, wherein the receiver circuit is signally connected with the control chip, and the control chip is connected with an actuating mechanism, and the low-power control circuit is characterized to further comprise a clock generator control circuit which is respectively and signally connected with the receiver circuit and the control chip, wherein the clock generator control circuit turns on the receiver circuit at regular time and wakes up the control chip only when the receiver outputs a signal, when the receiver doesn't output the signal, the control chip is in a sleep state, wherein the clock generator control circuit comprises a switch circuit, a RC bridge circuit, a clock generator control power circuit and an oscillator enable control circuit, wherein the switch circuit is electrically connected with the RC bridge circuit; the clock generator control power circuit supplies power source to the switch circuit and the RC bridge circuit; the control chip is signally connected with the oscillator enable control circuit; and the oscillator enable control circuit is signally connected with the switch circuit.

2. The low-power control circuit according to claim 1, wherein the switch circuit is a threshold oscillator analog switch circuit.

3. The low-power control circuit according to claim 2, wherein the power circuit is a buck circuit.

4. The low-power control circuit according to claim 3, wherein the buck circuit is a diode series buck circuit.

5. The low-power control circuit according to claim 2 is characterized in that the receiver circuit is a wireless receiver circuit, and the circuit comprises a high-frequency receiver frequency selecting circuit, a superheterodyne receiver circuit, an intermediate frequency filter, a crystal local oscillator circuit, a RXD squelch circuit, and the above circuits are electrically connected.

6. The low-power control circuit according to claim 5 is characterized in that the RXD squelch circuit comprises two parts: an analog integration ratio circuit and a logic processing circuit, wherein the received signal strength indication of the superheterodyne receiver circuit is output to the analog integration ratio circuit; the data of the data processing loop of the superheterodyne receiver circuit and the local output data are output to the logic processing circuit; the analog signal of the analog integration ratio circuit is output to the logic processing circuit; and the low noise signal is output by the logic processing circuit.

7. The low-power control circuit according to claim 2, wherein the power circuit is a buck circuit.

8. The low-power control circuit according to claim 7, wherein the buck circuit is a diode series buck circuit.

9. The low-power control circuit according to claim 1 is characterized in that the receiver circuit is a wireless receiver circuit, and the circuit comprises a high-frequency receiver frequency selecting circuit, a superheterodyne receiver circuit, an intermediate frequency filter, a crystal local oscillator circuit, a RXD squelch circuit, and the above circuits are electrically connected.

10. The low-power control circuit according to claim 9 is characterized in that the RXD squelch circuit comprises two parts: an analog integration ratio circuit and a logic processing circuit, wherein the received signal strength indication of the superheterodyne receiver circuit is output to the analog integration ratio circuit; the data of the data processing loop of the superheterodyne receiver circuit and the local output data are output to the logic processing circuit; the analog signal of the analog integration ratio circuit is output to the logic processing circuit; and the low noise signal is output by the logic processing circuit.

11. An operating method for a low-power control circuit comprises the following procedures: A. when a control chip is in a sleep state, a timing circuit operates; B. a clock generator control circuit generates a timing sequence signal to close or open a receiver circuit at regular time; C. when the receiver circuit is in an open state, if there are co-frequency signals, an output port produces variation of data, and go to procedure E; if there are no co-frequency signals, the output port keeps high level all the time; D. when the receiver circuit is in a close state, the receiver circuit does not operate; E. awaken the control chip, and the control chip outputs control command to enable the receiver circuit to be in the operating state within the time (such as 200 milliseconds) set by the control chip; in the operating time, the received signal is decoded and judged; if the signal is an invalid signal (different from the ID number stored in the control chip), close the receiver circuit and open the timing circuit, and the control chip goes to sleep state, and go to procedure B; if the signal is a valid signal, execute the corresponding command; after the command is executed, close the receiver circuit and open the timing circuit, and the control chip goes to sleep state, and go to procedure B.

12. The operating method for the low-power control circuit according to claim 11, wherein in the procedure E, after the control chip is awakened, the control chip directly outputs a control command to enable the receiver circuit to be in the operating state within the time set by the control chip; in the operating time, if the signal is an invalid signal (different from the ID number stored in the control chip), close the receiver circuit and open the timing circuit, and the control chip goes to sleep state, and go to procedure B; if the signal is a valid signal, execute the corresponding command, and directly control the receiver circuit to be in the open state all the time; after the command is executed, close the receiver circuit and open the timing circuit, and the control chip goes to sleep state, and go to procedure B.

13. The operating method for the low-power control circuit according to claim 11, wherein in the procedure E, after the control chip is awakened, the control chip outputs control command to the clock generator control circuit, and the clock generator control circuit controls the receiver circuit to be in operating state within the time set by the control chip; in the operating time, if the signal is an invalid signal (different from the ID number stored in the control chip), close the receiver circuit and open the timing circuit, and the control chip goes to sleep state, and go to procedure B; if the signal is a valid signal, execute the corresponding command, and output command to clock generator control circuit; the clock generator control circuit controls the receiver circuit to be in open state all the time; after the command is executed, close the receiver circuit and open the timing circuit, and the control chip goes to sleep state, and go to procedure B.

14. A low-power control circuit, comprising a receiver circuit and a control chip, wherein the receiver circuit is signally connected with the control chip, and the control chip is connected with an actuating mechanism, and a clock generator control circuit which is respectively and signally connected with the receiver circuit and the control chip, and the clock generator control circuit comprises a switch circuit, a RC bridge circuit, a clock generator control power circuit and an oscillator enable control circuit, wherein the switch circuit is electrically connected with the RC bridge circuit; the clock generator control power circuit supplies power source to the switch circuit and the RC bridge circuit; the control chip is signally connected with the oscillator enable control circuit; and the oscillator enable control circuit is signally connected with the switch circuit.

* * * * *